United States Patent
Kitamura (10) Patent No.: US 12,497,060 B2
(45) Date of Patent: Dec. 16, 2025

(54) VEHICLE DRIVER ASSISTANCE DEVICE, VEHICLE DRIVER ASSISTANCE METHOD, AND STORAGE MEDIUM

(71) Applicant: TOYOTA JIDOSHA KABUSHIKI KAISHA, Toyota (JP)

(72) Inventor: Kota Kitamura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/459,503

(22) Filed: Sep. 1, 2023

(65) Prior Publication Data
US 2024/0166227 A1 May 23, 2024

(30) Foreign Application Priority Data
Nov. 18, 2022 (JP) .................. 2022-185121

(51) Int. Cl.
| | |
|---|---|
| B60W 30/18 | (2012.01) |
| B60W 30/182 | (2020.01) |
| B60W 40/08 | (2012.01) |
| B60W 50/00 | (2006.01) |
| B60W 50/14 | (2020.01) |

(52) U.S. Cl.
CPC ........ B60W 50/14 (2013.01); B60W 50/0098 (2013.01); B60W 2540/229 (2020.02)

(58) Field of Classification Search
CPC .......... B60W 50/14; B60W 50/0098; B60W 2540/229; B60W 2050/143; B60W 30/18009; B60W 30/182; B60W 40/08; B60W 50/00; B60W 2040/0872; B60W 2540/221

USPC .......................................................... 701/23
See application file for complete search history.

(56) References Cited

U.S. PATENT DOCUMENTS

| | | | |
|---|---|---|---|
| 9,796,416 | B2 | 10/2017 | Fujii et al. |
| 10,108,190 | B2 | 10/2018 | Tomatsu et al. |
| 10,222,796 | B2 | 3/2019 | Ichikawa et al. |
| 10,308,254 | B2 | 6/2019 | Hirano et al. |
| 10,310,508 | B2 | 6/2019 | Kunisa et al. |
| 10,393,255 | B2 | 8/2019 | Nishimine |
| 10,520,939 | B2 | 12/2019 | Sato et al. |
| 10,525,983 | B2 | 1/2020 | Ichikawa et al. |

(Continued)

FOREIGN PATENT DOCUMENTS

| | | | |
|---|---|---|---|
| JP | 2011008457 A | * | 1/2011 |
| JP | 2019-061562 A | | 4/2019 |

(Continued)

*Primary Examiner* — Rachid Bendidi
*Assistant Examiner* — Hossam M Abd El Latif
(74) *Attorney, Agent, or Firm* — SoraIP, Inc.

(57) ABSTRACT

A vehicle driver assistance device executes safety assistance control for enhancing travel safety of a vehicle. When a level of fatigue of a driver of the vehicle becomes equal to or higher than a predetermined level, the vehicle driver assistance device increases a safety assistance level, which is a level for increasing the travel safety of the vehicle, by safety assistance control, and notifies the driver that the safety assistance level has been increased, and after the safety assistance level has been increased, when the vehicle passes a rest spot, which is a spot where the driver can rest, the vehicle driver assistance device lowers the safety assistance level and notifies the driver that the safety assistance level has been lowered.

6 Claims, 3 Drawing Sheets

(56) References Cited

U.S. PATENT DOCUMENTS

| | | |
|---|---|---|
| 10,654,482 B2 | 5/2020 | Urano et al. |
| 10,895,875 B2 | 1/2021 | Hashimoto et al. |
| 11,351,892 B1* | 6/2022 | Roy .................... G05D 1/43 |
| 2016/0096529 A1* | 4/2016 | Davidsson ............ G08B 21/06 340/576 |
| 2017/0106858 A1* | 4/2017 | Li ...................... B60W 30/09 |
| 2019/0143991 A1* | 5/2019 | Ito ..................... B60W 40/08 340/576 |
| 2020/0013285 A1* | 1/2020 | Wang .................... B60P 3/22 |
| 2020/0231165 A1 | 7/2020 | Miura |
| 2021/0245769 A1 | 8/2021 | Yamaoka et al. |
| 2022/0011132 A1* | 1/2022 | Jia ..................... G06N 20/00 |
| 2022/0194388 A1 | 6/2022 | Homma et al. |

FOREIGN PATENT DOCUMENTS

| | | |
|---|---|---|
| JP | 2021-128432 A | 9/2021 |
| JP | 2022-099250 A | 7/2022 |

* cited by examiner

VEHICLE DRIVER ASSISTANCE DEVICE, VEHICLE DRIVER ASSISTANCE METHOD, AND STORAGE MEDIUM

CROSS-REFERENCE TO RELATED APPLICATION

This application claims priority to Japanese Patent Application No. 2022-185121 filed on Nov. 18, 2022, incorporated herein by reference in its entirety.

BACKGROUND

1. Technical Field

The present disclosure relates to vehicle driver assistance devices, vehicle driver assistance methods, and storage media.

2. Description of Related Art

Vehicle driver assistance devices are known that are configured to warn a vehicle's driver of a risk of collision with an object. One known example of such vehicle driver assistance devices is a vehicle driver assistance device configured to give the vehicle's driver such a warning earlier when the driver is tired than when the driver is not tired (see, e.g., Japanese Unexamined Patent Application Publication No. 2022-99250 (JP 2022-9250 A)). This conventional vehicle driver assistance device warns the driver earlier when a risk of collision with an object is detected in a situation in which the driver may be too tired to spontaneously recognize such a risk in a timely manner. This enhances the travel safety of the vehicle.

SUMMARY

As described above, in the case where a vehicle driver assistance device is configured to warn the driver earlier when the driver is tired, sending a notification to notify the driver that a warning will be given earlier makes the driver feel safe, which is beneficial to the driver. However, sending such a notification may give the driver an excessive feeling of safety. If the driver has such an excessive feeling of safety, it may lead to reduced travel safety of the vehicle.

It is an object of the present disclosure to provide a vehicle driver assistance device, a vehicle driver assistance method, and a storage medium that can eliminate or reduce the possibility that a driver may have an excessive feeling of safety when a measure is taken to enhance the travel safety of a vehicle such as warning the driver earlier when the driver's level of fatigue increases.

A vehicle driver assistance device according to the present disclosure includes a control device that performs safety assistance control for enhancing travel safety of a vehicle. The control device is configured to, when a level of fatigue of a driver of the vehicle becomes equal to or higher than a predetermined level, raise a safety assistance level and notify the driver that the safety assistance level has been raised, the safety assistance level being a level at which the travel safety of the vehicle is ensured by the safety assistance control. The control device is configured to, when the vehicle passes a rest spot after the safety assistance level has been raised, lower the safety assistance level and notify the driver that the safety assistance level has been lowered, the rest spot being a spot where the driver is able to rest.

According to the vehicle driver assistance device of the present disclosure, when the level of fatigue of the driver increases, the safety assistance level is raised and the driver is notified that the safety assistance level has been raised. When the vehicle passes the rest spot, the safety assistance level is lowered and the driver is notified that the safety assistance level has been lowered. This can eliminate or reduce the possibility that the driver may have an excessive feeling of safety after passing the rest spot without resting at the rest point. That is, this can eliminate or reduce the possibility that the driver may have an excessive feeling of safety when a measure is taken to enhance the travel safety of the vehicle.

In the vehicle driver assistance device according to the present disclosure, the control device may be configured to notify the driver that the vehicle is approaching the rest spot, when a distance between the vehicle and the rest spot becomes equal to or less than a predetermined value after the safety assistance level has been raised.

According to the vehicle driver assistance device of the present disclosure, the driver is notified that the vehicle is approaching the rest spot after the safety assistance level has been raised due to the driver's increased level of fatigue. This can encourage the driver to rest at the rest spot.

In the vehicle driver assistance device according to the present disclosure, the control device may be configured to, once the safety assistance level is raised, keep notifying the driver that the safety assistance level has been raised until the safety assistance level is lowered.

According to the vehicle driver assistance device of the present disclosure, it is easier to make the driver aware that the safety assistance level has been raised. It is therefore easier to make the driver aware of the need to rest.

A vehicle driver assistance method according to the present disclosure is a method for performing safety assistance control for enhancing travel safety of a vehicle. The vehicle driver assistance method according to the present disclosure includes the steps of: when a level of fatigue of a driver of the vehicle becomes equal to or higher than a predetermined level, raising a safety assistance level and notifying the driver that the safety assistance level has been raised, the safety assistance level being a level at which the travel safety of the vehicle is ensured by the safety assistance control; and when the vehicle passes a rest spot after the safety assistance level has been raised, lowering the safety assistance level and notifying the driver that the safety assistance level has been lowered, the rest spot being a spot where the driver is able to rest.

According to the vehicle driver assistance method of the present disclosure, it is possible for the same reason as that described above to eliminate or reduce the possibility that the driver may have an excessive feeling of safety when a measure is taken to enhance the travel safety of the vehicle.

In a storage medium according to the present disclosure, a vehicle driver assistance program is a program that performs safety assistance control for enhancing travel safety of a vehicle. The vehicle driver assistance program according to the present disclosure is configured to, when a level of fatigue of a driver of the vehicle becomes equal to or higher than a predetermined level, raise a safety assistance level and notify the driver that the safety assistance level has been raised, the safety assistance level being a level at which the travel safety of the vehicle is ensured by the safety assistance control, and when the vehicle passes a rest spot after the safety assistance level has been raised, lower the safety assistance level and notify the driver that the safety assistance level has been lowered, the rest spot being a spot where the driver is able to rest.

According to the storage medium of the present disclosure, it is possible for the same reason as that described above to eliminate or reduce the possibility that the driver may have an excessive feeling of safety when a measure is taken to enhance the travel safety of the vehicle.

The components of the present disclosure are not limited to those in an embodiment of the present disclosure that will be described later with reference to the drawings. Other objects, other features, and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
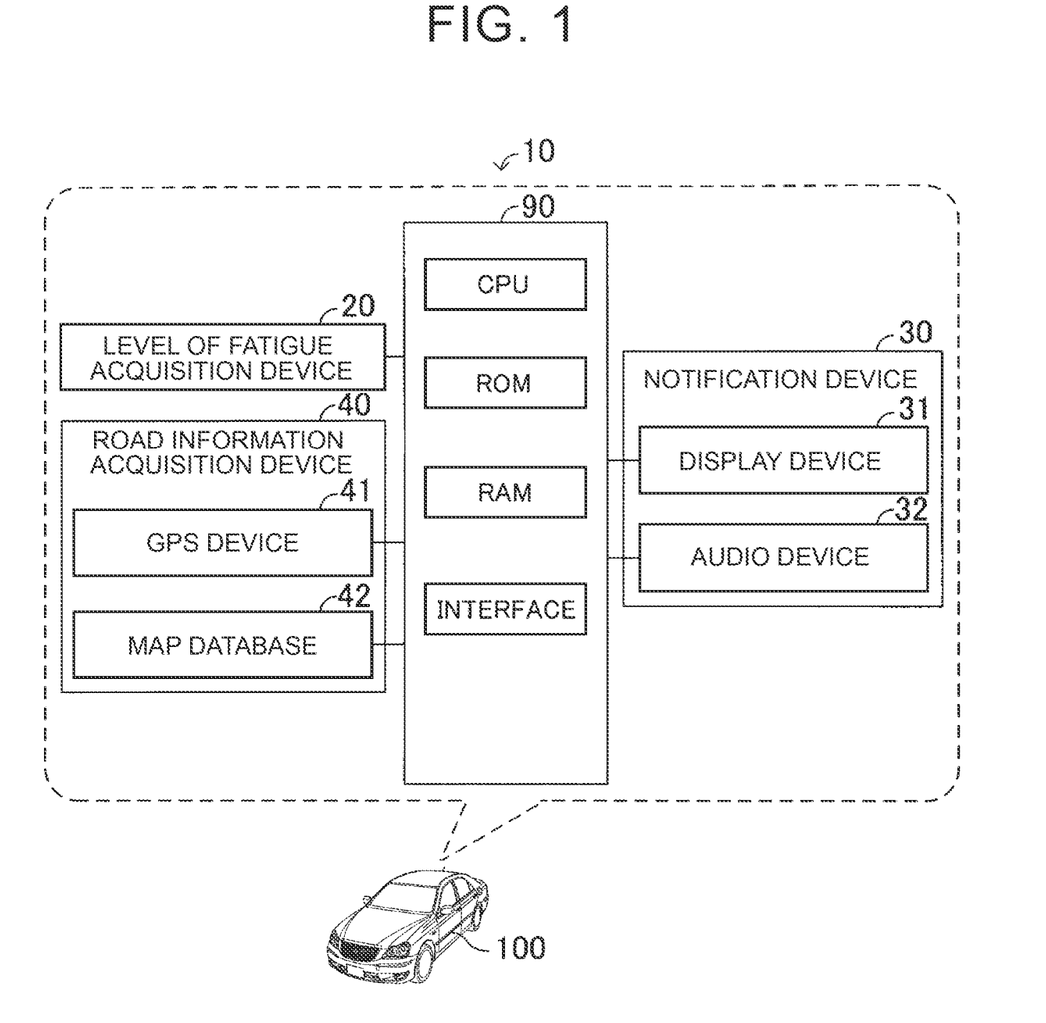
FIG. 1 is a diagram illustrating a vehicle driver assistance device according to an embodiment of the present disclosure.

Hereinafter, a vehicle driver assistance device according to an embodiment of the present disclosure will be described with reference to the drawings. In the present example, the vehicle driver assistance device 10 according to the embodiment of the present disclosure is mounted on the vehicle 100 as illustrated in FIG. 1. Hereinafter, the vehicle driver assistance device 10 will be described by taking as an example a case where an operator of the vehicle 100 is a person who rides on the vehicle 100 and drives the vehicle 100 (that is, a driver of the vehicle 100).

However, the operator of the vehicle 100 may be a person who drives the vehicle 100 remotely without getting on the vehicle 100 (that is, a remote operator of the vehicle 100). When the operator of the vehicle 100 is a remote operator, the vehicle driver assistance device 10 is mounted on the vehicle 100 and a remote operation facility installed outside the vehicle 100 for remotely driving the vehicle 100, and the functions of the vehicle driver assistance device 10 described below are shared by the vehicle driver assistance device 10 mounted on the vehicle 100 and the vehicle driver assistance device 10 mounted on the remote operation facility.

As illustrated in FIG. 1, the vehicle driver assistance device 10 includes an ECU 90 as a control device. ECU 90 is Electronic control unit. ECU 90 includes a microcomputer as a main part. The microcomputer includes a central processing unit (CPU), a read-only memory (ROM), a random access memory (RAM), a non-volatile memory, an interface, and the like. The CPU realizes various functions by executing instructions, programs, or routines stored in the ROM. The ROM is an example of a storage medium. In the present embodiment, the vehicle driver assistance device 10 includes one ECU, but as will be described later, a plurality of ECU may be provided, and various processes to be described later may be shared and executed by ECU.

Hereinafter, the operation of the vehicle driver assistance device 10 will be described. The vehicle driver assistance device 10 executes the routine illustrated in FIG. 2 at a predetermined calculation cycle. Therefore, at a predetermined timing, the vehicle driver assistance device 10 starts the processing from S200 of the routine shown in FIG. 2, advances the processing to S205, and determines whether or not the safety assistance system for executing the safety assistance control is in an operating state.

Figure 2:
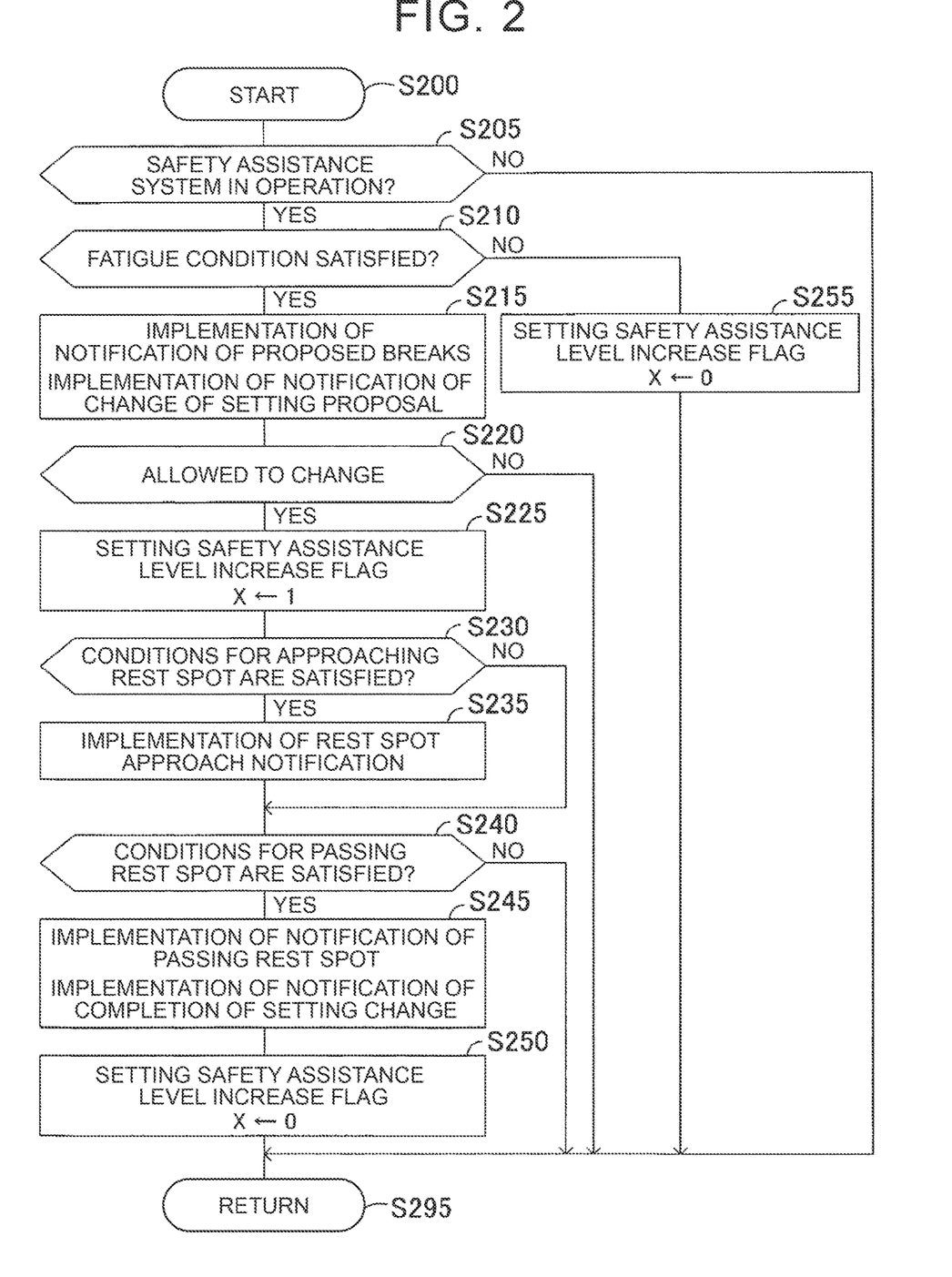
FIG. 2 is a flowchart illustrating a routine executed by the vehicle driver assistance device according to the embodiment of the present disclosure.

The safety assistance control is a control for enhancing the travel safety of the vehicle 100, and is, for example, a deviation prevention control, a lane maintenance control, a collision damage reduction control, a follow-up traveling control, and a surrounding situation notification control.

The deviation prevention control is one of the autonomous driving controls, and is a control for suppressing the vehicle 100 from deviating out of the lane or the road. According to the deviation prevention control, when the distance between the vehicle 100 and the lane end or the road end becomes small to a predetermined distance (first end distance), a notification (alarm) is issued to the driver. This notification is, for example, for notifying the driver that the vehicle 100 is likely to deviate from the lane or road. Further, according to the deviation prevention control, when the distance between the vehicle 100 and the lane end or the road end becomes smaller to a predetermined distance (second end distance) shorter than the first end distance, the vehicle 100 is autonomously steered and returned to the center of the lane.

Further, the lane keeping control is one of the autonomous driving controls, and is a control for causing the vehicle 100 to travel in the center of the lane. According to the lane keeping control, when the distance between the vehicle 100 and the centerline of the lane increases to a predetermined distance (first centerline distance), a notification (alarm) is given to the driver. This notification is, for example, for notifying the driver that the vehicle 100 is traveling off the center of the lane. Further, according to the lane keeping control, when the distance between the vehicle 100 and the centerline of the lane increases to a predetermined distance (second centerline distance) longer than the first centerline distance, the vehicle 100 is autonomously steered and returned to the center of the lane.

The collision damage mitigation control is one of the automatic driving controls, and is a control for mitigating damage caused by a collision between the vehicle 100 and an object ahead of the vehicle 100 by avoiding a collision between the vehicle and the object ahead of the vehicle. According to the collision damage mitigation control, for example, when the distance between the vehicle 100 and the object in front of it is reduced to a predetermined distance (first object distance), a notification (alarm) is performed to the driver. This notification is, for example, for notifying the driver that the vehicle 100 is likely to collide with an object in front of it. Further, according to the collision damage mitigation control, when the distance between the vehicle 100 and the object in front of it becomes smaller than the first object distance to a predetermined distance (second object distance), the vehicle 100 is autonomously braked and stopped in front of the object.

Further, the following travel control is one of the automatic driving controls, and is a control for autonomously accelerating and decelerating the vehicle 100 so that the vehicle 100 travels following the preceding vehicle. According to the following travel control, for example, when the distance between the vehicle 100 and the preceding vehicle becomes larger than a predetermined distance (target distance), the vehicle 100 is autonomously accelerated, and when the distance between the vehicle 100 and the preceding vehicle becomes smaller than the target distance, the vehicle 100 is autonomously decelerated.

The surrounding situation notification control is a control for notifying the driver of the situation around the vehicle 100 that the driver cannot confirm with his/her own eyes. According to the surrounding situation notification control, for example, when the distance between the other vehicle approaching the vehicle 100 and the vehicle 100 from the blind spot becomes small to a predetermined distance (predetermined other vehicle distance), a notification (alarm) is performed. This notification is, for example, for notifying the driver that another vehicle is approaching the vehicle 100 from the blind spot.

When determining "Yes" in S205, the vehicle driver assistance device 10 advances the process to S210 and determines whether or not the fatigue-condition C1 is satisfied. The fatigue condition C1 is a condition that the level of fatigue F of the driver of the vehicle 100 is equal to or higher than a predetermined level (predetermined level Fth).

As illustrated in FIG. 1, the vehicle 100 is equipped with a level of fatigue acquisition device 20. The level of fatigue acquisition device 20 is a device for acquiring the biological information of the driver and/or the behavior information of the vehicle 100. The level of fatigue acquisition device 20 includes, for example, a driver monitor camera for imaging the face of a driver of the vehicle 100 and/or a front camera for imaging the front of the vehicle 100.

The biological information is, for example, information regarding whether or not the driver of the vehicle 100 is dozing, and can be acquired based on image data provided from the driver monitor camera. Further, the behavior information of the vehicle 100 is, for example, information on whether or not the number of times or the distance traveled off the center of the lane while the vehicle 100 travels a certain distance is a predetermined number of times or a predetermined distance or more, and can be acquired based on image data provided from the front camera.

The level of fatigue acquisition device 20 is electrically connected to ECU 90, and the vehicle driver assistance device 10 acquires the biological information of the driver and/or the behavior information of the vehicle 100 by the level of fatigue acquisition device 20, and acquires the level of fatigue F of the driver by a known method based on the biological information of the driver and/or the behavior information of the vehicle 100.

When determining "Yes" in S210, the vehicle driver assistance device 10 advances the process to S215 and implements the break proposal notification and the setting change proposal notification.

The break proposal notification is a notification that proposes to the driver to take a break. In addition, the setting change proposal notification is a notification that proposes execution of a procedure (safety assistance level increase procedure) for increasing the safety assistance level by the safety assistance control. In other words, the setting change proposal notification is a notification that asks the driver whether or not to permit the execution of the safety assistance level increasing action. The safety assistance level is a level at which the travel safety of the vehicle 100 can be ensured by the safety assistance control, and the higher the safety assistance level is, the higher the travel safety of the vehicle 100 can be secured by the safety assistance control.

As illustrated in FIG. 1, the vehicle 100 is equipped with a notification device 30. The notification device 30 is a device for performing various notifications, and includes a display device 31 and an audio device 32 in the present example. The display device 31 is a device for displaying various images such as a meter display and a head-up display, and is electrically connected to an ECU 90. The audio device 32 is a device for outputting sound and sound, such as a speaker, and is electrically connected to ECU 90.

Figure 4:
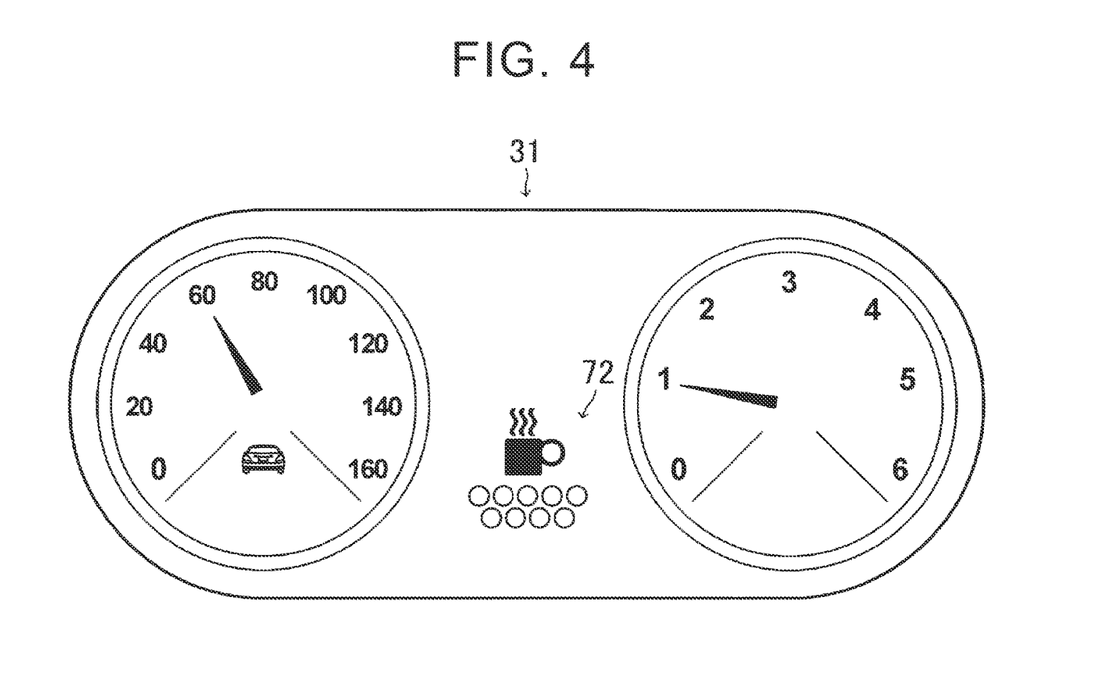
FIG. 4 is a diagram illustrating a display device of the vehicle driver assistance device according to the embodiment of the present disclosure.

As illustrated in FIG. 4, the vehicle driver assistance device 10 performs the rest proposal notification by executing at least one of a process of displaying the rest proposal image 72 by the display device 31 and a process of outputting the rest proposal sound from the audio device 32. The rest proposal image 72 is an image representing an icon and a word suggesting to the driver to take a break. In addition, the break suggestion voice is a voice suggesting a break to the driver.

Further, the vehicle driver assistance device 10 performs the setting change proposal notification by executing at least one of a process of displaying the safety assistance level increase proposal image by the display device 31 and a process of outputting the safety assistance level increase proposal sound from the audio device 32. The safety assistance level increase proposal image is an image representing a sentence asking the driver whether or not to perform the safety assistance level increase action. In addition, the safety assistance level increase proposal voice is a voice asking the driver whether or not to perform the safety assistance level increase action.

Note that the vehicle driver assistance device 10 may be configured to perform the safety assistance level increase action without performing the setting change proposal notification, and perform the notification by the notification device 30 to notify the driver that the safety assistance level increase action has been performed.

Next, the vehicle driver assistance device 10 advances the process to S220, and determines whether or not the driver has permitted the execution of a procedure (safety assistance level increasing procedure) for increasing the safety assistance level by the safety assistance control.

For example, in a case where the permission button and the rejection button are provided on the steering wheel of the vehicle 100, the vehicle driver assistance device 10 determines that the execution of the safety assistance level increase treatment is permitted when the permission button is operated by the driver. When the driver operates the reject button, the vehicle driver assistance device 10 determines that the execution of the safety assistance level increase treatment is not permitted.

Alternatively, when the vehicle driver assistance device 10 is configured to display the permission button image and the rejection button image by the display device 31 in S215, the vehicle driver assistance device 10 determines that the execution of the safety assistance level increasing treatment is permitted when the permission button image is operated by the driver. The vehicle driver assistance device 10 may be configured to determine that the execution of the safety assistance level increasing treatment is not permitted when the driver operates the reject button image.

When determining "Yes" in S220, the vehicle driver assistance device 10 advances the process to S225 and sets the value of the safety assistance level increase flag X to "1". According to this, in the routine shown in FIG. 3 described later, the safety assistance level by the safety assistance control is increased.

In S225, the value of the safety assistance level increase flag X is set to "1". As a result, when the safety assistance level by the safety assistance control is increased, the vehicle driver assistance device 10 may be configured to continue to notify the driver by the notification device 30 that the safety assistance level is increased until the safety assistance level is lowered, as will be described later.

Next, the vehicle driver assistance device 10 advances the process to S230, and determines whether or not the rest spot approach condition C2 is satisfied.

The rest spot approach condition C2 is a condition that the vehicle 100 has approached a rest spot. More specifically, the rest spot approach condition C2 is a condition that the distance from the vehicle 100 to the rest spot is equal to or less than a predetermined distance. The rest spot is a spot where the driver can park the vehicle 100 and rest. The rest spot is, for example, a parking area or a service area attached to an expressway.

As illustrated in FIG. 1, the vehicle 100 is equipped with a road information acquisition device 40. The road information acquisition device 40 is a device that acquires various types of road information including information on a rest spot. In the present embodiment, the road information acquisition device 40 includes a GPS device 41 and a map-database 42.

GPS device 41 is a device that receives a GPS signal. It is electrically connected to ECU 90. The vehicle driver assistance device 10 receives GPS signal via GPS device 41, and acquires the present position of the vehicle 100 based on GPS signal.

Further, the map database 42 is a database storing map data such as facilities including rest spots, and is electrically connected to ECU 90. Based on the present position of the vehicle 100 acquired based on GPS signal, the vehicle driver assistance device 10 detects, from the map database 42, a rest spot attached to the road on which the vehicle 100 will travel in the future, and acquires the distance between the rest spot and the vehicle 100.

When determining "Yes" in S230, the vehicle driver assistance device 10 advances the process to S235 and performs a rest spot approach notification. The vehicle driver assistance device 10 then advances the process to S240. On the other hand, when S230 determines "No", the vehicle driver assistance device 10 directly advances the process to S240.

The rest spot approach notification is a notification for notifying the driver that there is a rest spot. The vehicle driver assistance device 10 executes at least one of a process of displaying a rest spot image by the display device 31 and a process of outputting a rest spot sound from the audio device 32, thereby performing a rest spot approach notification. The rest spot image is an image representing an icon and/or a sentence indicating that there will be a rest spot. Further, the rest spot voice is a voice informing that there will be a rest spot.

When the process proceeds to S240, the vehicle driver assistance device 10 determines whether the rest spot passing condition C3 is satisfied. The rest spot passing condition C3 is a condition that the vehicle 100 has passed a rest spot. Based on the present position of the vehicle 100 and the map information in the map database 42 acquired based on GPS signal, the vehicle driver assistance device 10 determines whether the vehicle 100 has passed the rest spot.

When S240 determines "Yes", the vehicle driver assistance device 10 advances the process to S245, terminates the rest spot approach notification, and implements a rest spot passing notification and a setting change end notification.

The rest spot passing notification is a notification for notifying the driver that the vehicle 100 has passed the rest spot. The vehicle driver assistance device 10 executes at least one of a process of displaying a rest spot passing image by the display device 31 and a process of outputting a rest spot passing sound from the audio device 32, thereby performing the rest spot passing notification.

The rest spot passing image is an image representing an icon and/or wording indicating that the vehicle 100 has passed the rest spot. The rest spot passing sound is a sound indicating that the vehicle 100 has passed the rest spot.

In addition, the setting change end notification is a notification for notifying that the execution of the action for increasing the safety assistance level (the action for increasing the safety assistance level) by the safety assistance control is ended. The vehicle driver assistance device 10 performs the setting change end notification by executing at least one of a process of displaying the setting change end notification image by the display device 31 and a process of outputting the setting change end notification sound from the audio device 32. The setting change end image is an image representing an icon and/or a word indicating that the safety assistance level increasing procedure has been completed. The setting change end sound is a sound indicating that the safety assistance level increase treatment has been completed.

Note that the vehicle driver assistance device 10 ends the rest spot passage notification and the setting change end notification as appropriate when a predetermined time has elapsed after the start of the rest spot passage notification and the setting change end notification, or when the vehicle 100 has traveled a predetermined distance, or when the driver has performed a predetermined operation for requesting the end of the rest spot passage notification.

Next, the vehicle driver assistance device 10 advances the process to S250 and sets the safety assistance level increase flag X to "0". After that, the vehicle driver assistance device 10 advances the processing to S295, and ends the processing of the routine once. Thus, in the routine illustrated in FIG. 3 described later, the safety assistance level by the safety assistance control is lowered.

On the other hand, when S240 determines "No", the vehicle driver assistance device 10 directly advances the processing to S295, and ends the processing of this routine once.

When S220 determines "No", the vehicle driver assistance device 10 directly advances the processing to S295, and ends the processing of this routine once.

When S210 determines "No", the vehicle driver assistance device 10 advances the process to S225 and sets the safety assistance level increase flag X to "0". After that, the vehicle driver assistance device 10 advances the processing to S295, and ends the processing of the routine once.

When S205 determines "No", the vehicle driver assistance device 10 directly advances the processing to S295, and ends the processing of this routine once. At this time, when the value of the safety assistance level increase flag X is set to "1", the vehicle driver assistance device 10 sets the value of the safety assistance level increase flag X to "0".

Figure 3:
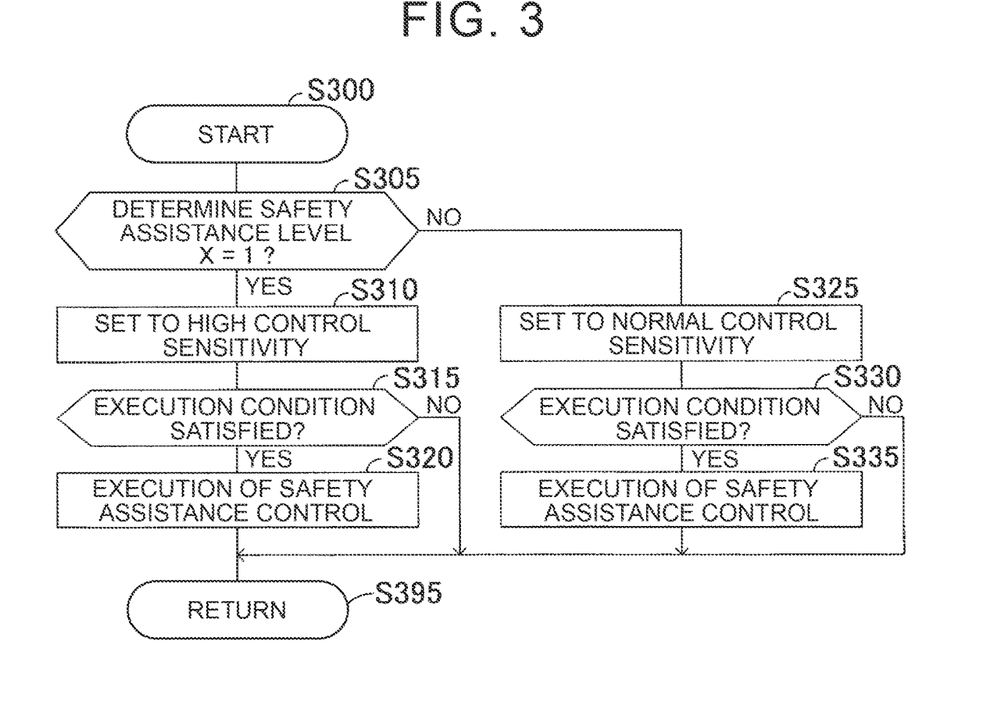
FIG. 3 is a flowchart illustrating a routine executed by the vehicle driver assistance device according to the embodiment of the present disclosure.

Further, the vehicle driver assistance device 10 executes the routine illustrated in FIG. 3 at a predetermined calculation cycle. Therefore, at a predetermined timing, the vehicle driver assistance device 10 starts the processing from S300 of the routine shown in FIG. 3, advances the processing to S305, and determines whether or not the value of the safety assistance level increase flag X is "1".

When determining "Yes" in S305, the vehicle driver assistance device 10 advances the process to S310 and sets the control sensitivity of the safety assistance control to a control sensitivity (high control sensitivity) higher than the normal control sensitivity.

The control sensitivity of the safety assistance control is an index indicating the ease of execution of various controls in the safety assistance control and the magnitude or responsiveness of the control amount in the various controls. When the control sensitivity is high, the execution timing of various controls in the safety assistance control becomes earlier. In addition, the amount of control in the various types of control increases. In addition, the responsiveness in the various controls is increased.

For example, in a case where the safety assistance control is the lane departure prevention control, if the first end distance is set to be larger than the normal value, the execution timing of the notification control becomes earlier. That is, the control sensitivity of the notification control is increased. The first end distance is used to determine whether to execute notification control (alarm control) for notifying that the vehicle 100 may deviate from the lane end or the road end.

Also, in the case where the safety assistance control is the lane departure prevention control, if the second end distance is made larger than the normal value, the execution timing of the autonomous steering control becomes earlier. That is, the control sensitivity of the autonomous steering control increases. The second end distance is used to determine whether to execute autonomous steering control for autonomously steering the vehicle 100 back to the center of the lane.

Also, in the case where the safety assistance control is the lane departure prevention control, if the amount of steering for steering the vehicle 100 by the autonomous steering control is larger than a normal value, the amount of autonomous steering of the vehicle 100 by the autonomous steering control is increased. That is, the control sensitivity of the autonomous steering control increases.

Alternatively, in the case where the safety assistance control is the lane keeping control, if the first centerline distance used for determining whether or not to execute the notification control (alarm control) for notifying that the vehicle 100 is traveling outside the center of the lane is made smaller than a normal value, the timing of executing the notification control is accelerated. That is, the control sensitivity of the notification control is increased. The first centerline distance is used to determine whether or not to execute notification control (alarm control) for notifying that the vehicle 100 is traveling out of the center of the lane.

Also, in the case where the safety assistance control is the lane keeping control, if the second centerline distance is made larger than the normal value, the execution timing of the autonomous steering control becomes earlier. That is, the control sensitivity of the autonomous steering control increases. The second centerline distance is used to determine whether to execute autonomous steering control for autonomously steering the vehicle 100 and returning it to the center of the lane.

Also, in the case where the safety assistance control is the lane keeping control, if the amount of steering for steering the vehicle 100 by the autonomous steering control is larger than a normal value, the amount of autonomous steering of the vehicle 100 by the autonomous steering control is increased. That is, the control sensitivity of the autonomous steering control increases.

Alternatively, in a case where the safety assistance control is the collision damage mitigation control, if the first object distance is set to be larger than the normal value, the execution timing of the notification control becomes earlier. That is, the control sensitivity of the notification control is increased. The first object distance is used to determine whether or not to execute notification control (alarm control) for notifying the driver that the vehicle 100 is likely to collide with an object in front of the vehicle.

Also, in the case where the safety assistance control is the collision damage mitigation control, if the second object distance is set to be larger than the normal value, the execution timing of the autonomous braking control becomes earlier. That is, the control sensitivity of the autonomous braking control increases. The second object distance is used to determine whether to execute autonomous braking control for autonomously braking the vehicle 100 and stopping in front of the object.

Also, in the case where the safety assistance control is the collision damage reduction control, if the braking force for braking the vehicle 100 by the autonomous braking control is set to be larger than a normal value, the braking force applied to the vehicle 100 by the autonomous braking control is increased. That is, the control sensitivity of the autonomous braking control increases.

Alternatively, in the case where the safety assistance control is the following travel control, when the responsiveness to the target distance when the vehicle 100 is accelerated or decelerated by the autonomous acceleration/deceleration control that autonomously accelerates or decelerates the vehicle 100 is made higher than the normal responsiveness, the control sensitivity of the autonomous acceleration/deceleration control becomes higher.

Alternatively, in a case where the safety assistance control is the peripheral state notification control, if the predetermined other vehicle distance is set to be larger than the normal value, the execution timing of the notification control becomes earlier. That is, the control sensitivity of the notification control is increased. The predetermined other-vehicle distance is used to determine whether or not to execute notification control (alarm control) for notifying the driver that the other vehicle is approaching the vehicle 100 from the blind spot.

Thus, by making the control sensitivity of the various controls in the safety assistance control higher than the normal control sensitivity, the safety assistance level by the safety assistance control can be increased.

Next, the vehicle driver assistance device 10 advances the process to S315 and determines whether or not the execution condition C4 is satisfied.

The execution condition C4 is a condition for starting various kinds of control in the safety assistance control. For example, the execution condition C4 is a condition that the distance between the vehicle 100 and the lane end or the road end is reduced to the first end distance in the lane departure prevention control. The execution condition C4 is a condition that the distance between the vehicle 100 and the lane end or the road end is reduced to the second end distance. In the lane keeping control, the execution condition C4 is a condition that the distance between the vehicle 100 and the centerline of the lane is increased to the first centerline distance. The execution condition C4 is a condition that the distance between the vehicle 100 and the centerline of the lane is increased to the second centerline distance. The execution condition C4 is a condition that the distance between the vehicle 100 and the object in front of it is reduced to the first object distance in the collision damage reduction control. The execution condition C4 is a condition that the distance between the vehicle 100 and the object ahead of it is reduced to the second object distance. The execution condition C4 is a condition that the distance between the vehicle 100 and the preceding vehicle becomes larger or smaller than the target distance in the following travel control. The execution condition C4 is a condition that, in the surrounding condition notification control, the distance between the other vehicle approaching the vehicle 100 and the vehicle 100 from the blind spot is reduced to the predetermined other vehicle distance.

When S315 determines "Yes", the vehicle driver assistance device 10 advances the processing to S320, executes the safety assistance control, and then advances the processing to S395, and ends the processing of this routine once.

On the other hand, when S315 determines "No", the vehicle driver assistance device 10 directly advances the processing to S395, and ends the processing of this routine once. At this time, when the safety assistance control is executed, the vehicle driver assistance device 10 ends the safety assistance control.

When S305 determines "No", the vehicle driver assistance device 10 advances the process to S325 and sets the control sensitivity to a normal control sensitivity lower than the high control sensitivity. That is, the vehicle driver assistance device 10 lowers the safety assistance level by the safety assistance control by lowering the control sensitivity of the safety assistance control.

Next, the vehicle driver assistance device 10 advances the process to S330 and determines whether or not the execution-condition C4 is satisfied.

When determining "Yes" in S330, the vehicle driver assistance device 10 advances the process to S335 and executes the safety assistance control. After that, the vehicle driver assistance device 10 advances the processing to S395, and ends the processing of the routine once.

On the other hand, when S330 determines "No", the vehicle driver assistance device 10 directly advances the processing to S395, and ends the processing of this routine once. At this time, when the safety assistance control is executed, the vehicle driver assistance device 10 ends the safety assistance control.

Effect

According to the vehicle driver assistance device 10, the safety assistance level is raised when the driver's level of fatigue increases, and the driver is notified that the safety assistance level has been raised. When the vehicle 100 passes a rest spot, the safety assistance level is lowered and the driver is notified that the safety assistance level has been lowered. This can eliminate or reduce the possibility that the driver may have an excessive feeling of safety after passing the rest spot without resting at the rest spot. That is, this can eliminate or reduce the possibility that the driver may have an excessive feeling of safety when a measure is taken to enhance the travel safety of the vehicle 100.

The present disclosure is not limited to the above embodiment, and various modifications can be adopted within the scope of the present disclosure.

What is claimed is:

1. A vehicle driver assistance device configured to be mounted on a vehicle, comprising:
   a camera configured to acquire an image of a view in front of the vehicle;
   a display;
   a memory storing an assistance level; and
   a processor configured to
      execute a lane deviation prevention control according to the assistance level to implement autonomous control of a steering wheel of the vehicle for returning the vehicle to a center of a lane of a road when a first distance between the vehicle and an edge of the lane becomes less than a first threshold distance,
      acquire the image of the view in front of the vehicle from the camera,
      detect that the number of times the vehicle deviated from the center of the lane while the vehicle runs a predetermined distance has reached a predetermined number of times based on the acquired image,
      subsequently raise the assistance level stored in the memory from an original assistance level, wherein the processor increases a value of the first threshold distance from a first original value of the first threshold distance,
      control the display to display a first image, the first image indicating that the assistance level is raised,
      autonomously control the steering wheel according to the raised assistance level,
      detect that the vehicle has passed a rest spot located on a travel route of the vehicle based on a current location of the vehicle obtained based on a GPS signal, the rest spot including a parking where a driver in the vehicle is able to rest,
      subsequently lower the raised assistance level stored in the memory to the original assistance level, wherein the processor decreases the increased value of the first threshold distance to the first original value,
      control the display to display a second image, the second image indicating that the assistance level is lowered to the original assistance level, and
      autonomously control the steering wheel according to the original assistance level.

2. The vehicle driver assistance device according to claim 1, wherein the processor is further configured to
   detect that the vehicle is approaching the rest spot when a distance between the vehicle and the rest spot becomes equal to or less than a predetermined value after the assistance level has been raised based on the current location of the vehicle obtained based on the GPS signal, and
   control the display to display a third image, the third image indicating that the vehicle is approaching the rest spot.

3. The vehicle driver assistance device according to claim 1, wherein the processor is further configured to control the display to keep displaying the first image until the raised assistance level is lowered to the original assistance level.

4. The vehicle driver assistance device according to claim 1, wherein the processor is further configured to
   execute a collision damage reduction control according to the assistance level to implement autonomous control of a brake of the vehicle for stopping the vehicle when a second distance between the vehicle and an object in front of the vehicle becomes less than a second threshold distance,
   in the raising of the assistance level, increase a value of the second threshold distance from a second original value of the second threshold distance,
   autonomously control the brake according to the raised assistance level,
   in the lowering of the raised assistance level, decrease the increased value of the second threshold distance to the second original value, and autonomously control the brake according to the original assistance level.

5. The vehicle driver assistance device according to claim 1, wherein the rest spot is a parking area or a service area in an expressway.

6. The vehicle driver assistance device according to claim 1, wherein the display is a head-up display.

\* \* \* \* \*